Jan. 2, 1962     R. E. TOBEY     3,015,215
HOME APPLIANCE
Filed July 22, 1959
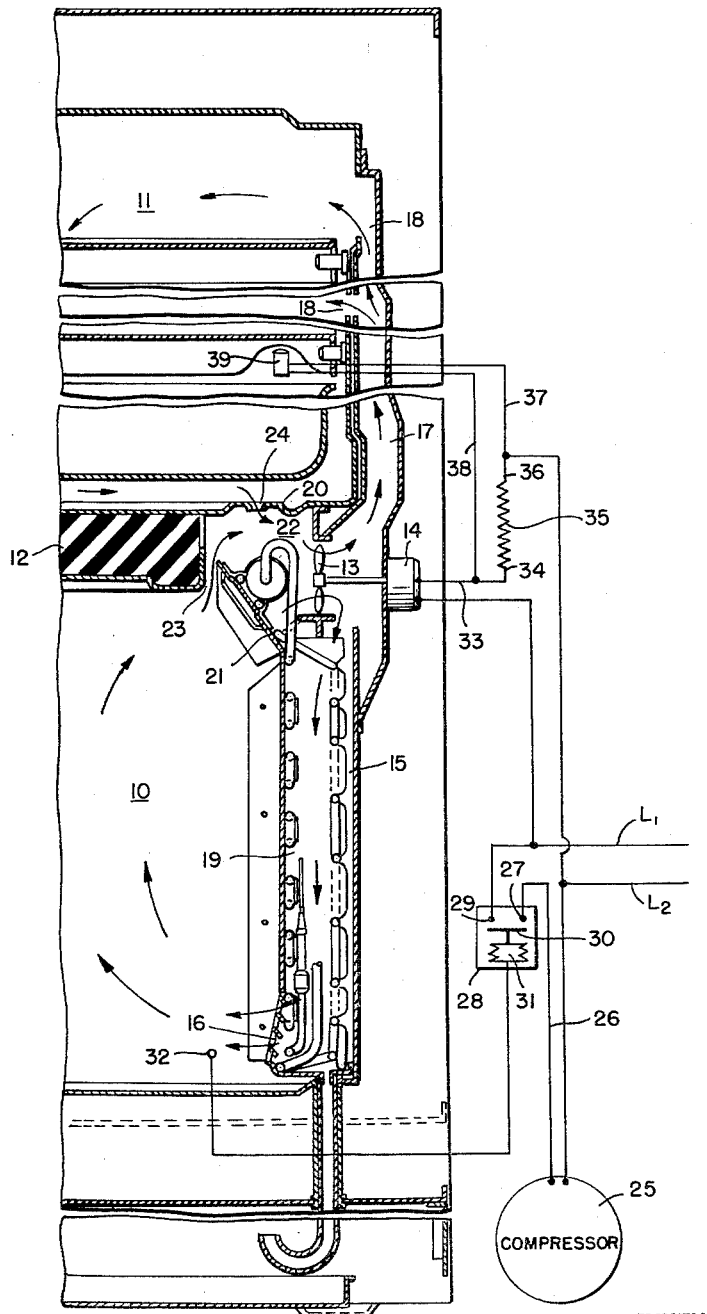
INVENTOR:
RAYMOND E. TOBEY
BY
*Hofgren, Brady, Wegner, Allen & Stellman*
ATT'YS

United States Patent Office 3,015,215
Patented Jan. 2, 1962

3,015,215
HOME APPLIANCE
Raymond E. Tobey, Evansville, Ind., assignor to Whirlpool Corporation, a corporation of Delaware
Filed July 22, 1959, Ser. No. 828,905
8 Claims. (Cl. 62—96)

This invention relates to refrigerating apparatus and to methods of cooling.

The instant invention is concerned with refrigerating apparatus and methods of cooling of the type disclosed and claimed in copending Hubacker and Krug application Serial No. 807,671, filed April 20, 1959, and assigned to the same assignee as that for the present invention. The refrigerating apparatus of that application provides separate refrigerated chambers, as in a domestic refrigerator of the type in which one chamber is used for storing fresh foods at above freezing temperatures and another chamber is used for storing frozen foods at below freezing temepratures. Means are provided for forcing separate air streams through the two chambers, for intermingling the separate streams, for dividing the intermingled air into two separate streams, and for cooling the low temperature chamber air stream only after the separation of the air into the two streams. Thus, the air stream through the lower temperature chamber is cooled directly by the refrigerating apparatus evaporator, while the air stream through the storage or relatively higher temperature chamber is cooled primarily by the intermingling of the two streams.

In the instant invention the operation of the air forcing means is controlled to regulate or control the temperature in the higher temperature chamber without substantially changing the temperature in the lower temperature chamber.

One of the features of this invention, therefore, is to provide a new and improved method of cooling a first chamber to a substantially maintained predetermined low temperature and cooling a second chamber to a predetermined narrow range of temperatures higher than said predetermined low temperature.

Another feature of the invention is to provide such a method of cooling comprising continuously simultaneously circulating a first stream of air through the first chamber and a second stream of air through the second chamber, mingling the air streams at a common juncture followed by separating the air into the first and second streams, cooling the first stream only subsequent to its passage through the juncture, and causing the total volume rate of circulation of the air to be successively a first predetermined rate when the temperature of the second chamber decreases to substantially the lowest temperature of the range and a second higher predetermined rate when the temperature of the second chamber reaches the highest temperature of the range.

Still another feature of the invention is the provision of refrigerating apparatus comprising means forming a relatively low temperature first chamber, means forming a relatively high temperature second chamber, means forming a mixing chamber, means for circulating at any one of a plurality of volume rates of flow a first air stream through the first chamber and a second air stream through the second chamber, means directing both air streams through the mixing chamber for intermingling therein, and means for cooling the first air stream only at a point downstream from the mixing chamber.

A further feature of the invention is the provision of such refrigerating apparatus wherein the means for circulating the air streams operates continuously.

Other features and advantages of the invention will be apparent from the following description taken in conjunction with the accompanying drawing wherein the figure is a fragmentary, semi-diagrammatic vertical sectional view through an embodiment of the invention.

As indicated above, the instant invention is a modification of that of the Hubacker and Krug application Ser. No. 807,671 to which reference may be had for a complete and detailed description of the common structure. Briefly, the refrigerating apparatus includes means defining a relatively low temperature or freezing first chamber 10 and a relatively high temperature second chamber 11 separated by an insulated wall 12. A fan 13 preferably of the ordinary propeller type driven by a motor 14 delivers a first stream of air downwardly through a first passage 15 opening at a plurality of outlets 16 to first chamber 10, and a second stream of air upwardly through a second passage 17 opening at outlets 18 to second chamber 11. A refrigerant evaporator 19 of conventional construction is disposed in passage 15 for heat transfer relationship with the first stream of air passing therethrough as well as heat transfer directly by radiation and conduction between the evaporator and the chamber 10. In the embodiment illustrated, the first chamber 10 is a frozen food chamber while the second chamber 11 is a fresh food chamber.

Directly forwardly of fan 13, an upper wall portion 20 and a lower wall portion 21 define a mixing chamber 22. The first stream of air passes from first chamber 10 to mixing chamber 22 through a passage 23 between lower wall portion 21 and insulated wall 12, and the second stream of air passes from second chamber 11 to mixing chamber 22 through a passage 24 in upper wall portion 20.

Electrical power for operating the refrigerating apparatus is supplied from a suitable power supply (not shown) through leads L1 and L2. The compressor of the refrigerating apparatus is of ordinary construction and is electrically connected to lead L2 and through a lead 26 to one stationary contact 27 of a thermostat switch 28 of conventional construction. The other stationary contact 29 of the thermostat switch is connected to lead L1 and a movable contact 30 of the thermostat switch is operated by a mechanism 31 controlled by a capillary bulb 32 disposed in first chamber 10.

Motor 14 for the fan is connected to lead L1 and through a lead 33 to one end 34 of a resistor 35, the other end 36 of which is connected to lead L2. Connected in parallel across resistor 35 by leads 37 and 38 is a normally closed thermostat switch 39 of conventional construction arranged to be operated by a small temperature differential. Thermostat switch 39 may be a creep type switch as it serves merely to short circuit resistor 35 which is in series with motor 14 to power supply lead L2 at all times.

Illustratively, thermostat switch 28 is arranged to control compressor 25 so as to maintain the temperature of first chamber 10 at substantially zero degrees Fahrenheit. Thermostat switch 39 is arranged to open when the temperature of second chamber 11 decreases to approximately 34° F. When switch 39 opens, current to motor 14 passes through resistor 35. The resistor has a value such as to reduce the speed of the fan sufficiently to prevent a rate of air delivery to the chamber 11 which would further lower the temperature thereof. In one embodiment, it has been found that with a conventional refrigerating apparatus operating in a 70° F. room a reduction in the fan speed of approximately 25% to 30% effects a temperature of approximately 40° F. in storage chamber 11 when the fan operates continuously at the low speed. Thus, upon reduction of the fan speed, the temperature of chamber 11 slowly rises from the 34° F. temperature at which switch 39 opened. However, when the temperature rises approximately 1° (to approximately 35° F.), switch 39 recloses thereby shorting out resistor 35 and connecting motor 14 directly across leads L1 and L2 to effect high speed operation of the fan. Thus, the repeated opening and closing of switch 39 effectively maintains the temperature within section chamber 11 substantially at 34°–35° F. while the temperature within first chamber 10 is maintained substantially at zero degrees Fahrenheit.

The low temperature chamber 10 which is customarily the freezing chamber in that it is maintained at a temperature below the freezing point of water contains along one wall thereof the single evaporator 19. In addition, air is circulated by the fan 13 over this evaporator and directly into the chamber 10, as previously described. The upper chamber 11 is normally maintained at a temperature which is above the freezing point of water. The vertical passage 17 leading from the fan 13 into the upper chamber 11 is ordinarily considerably smaller than is the air passage 15 leading over the evaporator 19. Therefore, when the fan 13 is operating at high speed, air is forced through these two passages 15 and 17 to maintain the temperature conditions in the chambers 10 and 11. However, when chamber 11 gets too cold, as previously described, the resistor 35 is cut in to reduce the speed of the fan 13. At this lower speed air circulation through relatively tall air passage 17 is such that there is less cooling of the chamber 11 because of reduced air flow and the temperature in chamber 11 begins to rise slowly. However, this reduced fan speed does not materially effect the temperature in the freezing chamber 10 which is connected to the exhaust of the fan 13 by way of the relatively short air passage 15 with the result that the freezing condition is maintained in the chamber 10 even at this lower fan speed.

As thermostat switch 39 may be of the inexpensive creep type and resistor 35 comprises a simple and inexpensive circuit control element, the invention provides an extremely low cost method of controlling accurately a desired higher temperature in second chamber 11 without affecting substantially the temperature within the low temperature first chamber 10.

While I have shown and described one embodiment of my invention, it is to be understood that it is capable of many modifications. Changes, therefore, in the construction and arrangement may be made without departing from the spirit and scope of the invention as defined in the appended claims.

The embodiments of the invention in which an exclusive property or privilege is claimed are defined as follows:

1. The method of cooling a first chamber to a substantially constant predetermined temperature and cooling a second chamber to a predetermined range of temperatures higher than said predetermined temperature, comprising: continuously simultaneously circulating a first stream of air in a substantially closed circuit including through said first chamber and a second stream of air in a substantially closed circuit including through said second chamber, said first stream being at a volume rate of flow greater than the volume rate of flow of said second stream; mingling the air streams at a common juncture followed by separating the air into said first and second streams; cooling said first stream only subsequent to its passage through said juncture; and causing the total volume rate of circulation of the air in both said streams to be successively a first predetermined rate when the temperature of the second chamber decreases to substantially the lowest temperature of said range and a second higher predetermined rate when the temperature of the second chamber reaches the highest temperature of said range.

2. The method of cooling a first chamber to a substantially constant predetermined temperature and cooling a second chamber to a predetermined range of temperatures higher than said predetermined temperature, comprising: continuously simultaneously circulating a first stream of air in a substantially closed circuit including through said first chamber and a second stream of air in a substantially closed circuit including through said second chamber, said first stream being at a volume rate of flow greater than the volume rate of flow of said second stream; mingling the air streams at a common juncture followed by separating the air into said first and second streams; cooling said first stream only subsequent to its passage through said juncture, and only whenever the temperature of the first chamber rises above the predetermined temperature; and causing the total volume rate of circulation of the air in both said streams to be successively a first predetermined rate when the temperature of the second chamber decreases to substantially the lowest temperature of said range and a second higher predetermined rate when the temperature of the second chamber reaches the highest temperature of said range.

3. Refrigerating apparatus, comprising: means forming a relatively low temperature first chamber; means forming a relatively high temperature second chamber; means forming a mixing chamber; means for circulating at a selected one of a plurality of volume rates of flow a first air stream in a substantially closed circuit including through the first chamber and a second air stream in a substantially closed circuit including through the second chamber; means directing both air streams through the mixing chamber, said first stream being at a volume rate of flow greater than the volume rate of flow of said second stream; means directing both air streams through the mixing chamber for intermingling therein; and means for cooling said first air stream only at a point downstream from said mixing chamber.

4. Refrigerating apparatus, comprising: means forming a relatively low temperature first chamber; means forming a relatively high temperature second chamber; means forming a mixing chamber; means for continuously circulating at a selected one of a plurality of volume rates of flow a first air stream in a substantially closed circuit including through the first chamber and a second air stream in a substantially closed circuit including through the second chamber, said first stream being at a volume rate of flow greater than the volume rate of flow of said second stream; means directing both air streams through the mixing chamber for intermingling therein; and means for cooling said first air stream only at a point downstream from said mixing chamber.

5. Refrigerating apparatus, comprising: means forming a relatively low temperature first chamber; means forming a relatively high temperature second chamber; means forming a mixing chamber having a first inlet communicating with the first chamber and a second inlet communicating with the second chamber; air moving means adjacent said mixing chamber having an inlet communicating with the mixing chamber, a first outlet communicating with the first chamber for continuously circulating air in a substantially closed circuit therethrough and into the mixing chamber in a first stream and a second outlet communicating with the second chamber for continuously circulating air in a substantially closed circuit therethrough and into the mixing chamber in a second stream, said first stream being at a volume rate of flow greater than the volume rate of flow of said second stream; means controlling said air moving means to circulate said air through the first and second chambers at a first total volume rate of flow when the temperature of the second chamber decreases to a predetermined first temperature and at a second higher total volume rate of flow when the temperature of the second chamber reaches a predetermined, higher second temperature; and means for cooling said first air stream only at a point downstream from said mixing chamber.

6. Refrigerating apparatus, comprising: means forming a relatively low temperature first chamber; means forming a relatively high temperature second chamber; means forming a mixing chamber having a first inlet communicating with the first chamber and a second inlet communicating with the second chamber; air moving means adjacent said mixing chamber having an inlet communicating with the mixing chamber, a first outlet communicating with the first chamber for circulating air in a substantially closed circuit therethrough and into the mixing chamber in a first stream and a second outlet communicating with thhe second chamber for circulating air in a substantially closed circuit therethrough and into the mixing chamber in a second stream, said first stream being at a volume rate of flow greater than the volume rate of flow of said second stream; means controlling said air moving means to circulate said air through the first and second chambers at a first total volume rate of flow when the temperature of the second chamber decreases to a predetermined first temperature and at a second higher total volume rate of flow when the temperature of the second chamber reaches a predetermined, higher second temperature; and means for cooling said first air stream only at a point downstream from said mixing chamber.

7. Refrigerating apparatus, comprising: means forming a relatively low temperature first chamber; means forming a relatively high temperature second chamber; means forming a mixing chamber having a first inlet communicating with the first chamber and a second inlet communicating with the second chamber; air moving means adjacent said mixing chamber having an inlet communicating therewith, a first outlet and a second outlet; means forming a first air passage communicating with said first outlet and emptying into the first chamber; means forming a second air passage adjacent said second chamber communicating with said second outlet, said second air passage having a greater pressure drop of air flow therethrough than the pressure drop of air flow through said first passage; means forming an outlet from the second passage to the second chamber, the air moving means thereby continuously circulating air in a first stream through the first passage, first chamber and mixing chamber and in a second stream through the second passage, second chamber and mixing chamber with the first stream having a greater volume rate of flow than said second stream; means controlling the air moving means to circulate said air at a first total volume rate of flow when the temperature of the second chamber decreases to a predetermined first temperature and at a second higher total volume rate of flow when the temperature of the second chamber reaches a predetermined, higher second temperature; and cooling means for the air in said first passage, whereby the temperature in the second chamber is varied without substantial variation of temperature in the first chamber.

8. Refrigerating apparatus, comprising: means forming a relatively low temperature first chamber; means forming a relatively high temperature second chamber; means forming a mixing chamber having a first inlet communicating with the first chamber and a second inlet communicating with the second chamber; air moving means adjacent said mixing chamber having an inlet communicating therewith, a first outlet and a second outlet; means forming a first air passage communicating with said first outlet and emptying into the first chamber; means forming a second air passage adjacent said second chamber communicating with said second outlet, said second air passage having a greater pressure drop of air flow therethrough than the pressure drop of air flow through said first passage; means forming an outlet from the second passage to the second chamber, the air moving means thereby circulating air in a first stream through the first passage, first chamber and mixing chamber and in a second stream through the second passage, second chamber and mixing chamber with the first stream having a greater volume rate of flow than said second stream; means controlling the air moving means to circulate said air at a first total volume rate of flow when the temperature of the second chamber decreases to a predetermined first temperature and at a second higher total volume rate of flow when the temperature of the second chamber reaches a predetermined, higher second temperature; and cooling means for the air in said first passage, whereby the temperature in the second chamber is varied without substantial variation of temperature in the first chamber.

References Cited in the file of this patent

UNITED STATES PATENTS

| | | |
|---|---|---|
| 2,259,803 | Cummings | Oct. 21, 1941 |
| 2,361,090 | Dickey | Oct. 24, 1944 |
| 2,425,295 | Morris | Aug. 12, 1947 |
| 2,907,180 | Mann | Oct. 6, 1959 |
| 2,908,147 | Powers | Oct. 13, 1959 |

UNITED STATES PATENT OFFICE

CERTIFICATE OF CORRECTION

Patent No. 3,015,215                           January 2, 1962

Raymond E. Tobey

It is hereby certified that error appears in the above numbered patent requiring correction and that the said Letters Patent should read as corrected below.

Column 4, lines 25 and 26, strike out ";means directing both air streams through the mixing chamber".

Signed and sealed this 29th day of May 1962.

(SEAL)
Attest:

ERNEST W. SWIDER                           DAVID L. LADD
Attesting Officer                             Commissioner of Patents